United States Patent
Hutton et al.

(10) Patent No.: US 7,241,084 B2
(45) Date of Patent: Jul. 10, 2007

(54) TOOL ASSEMBLY WITH UNIVERSAL COUPLING FOR VARIOUS TOOLS, FOR WORK ON UNDERGROUND PIPES

(75) Inventors: William M. Hutton, Nazareth, PA (US); Frank P. Russo, Swiftwater, PA (US)

(73) Assignee: Omega Tools, Inc., Portland, PA (US)

( * ) Notice: Subject to any disclaimer, the term of this patent is extended or adjusted under 35 U.S.C. 154(b) by 390 days.

(21) Appl. No.: 10/881,048

(22) Filed: Jun. 30, 2004

(65) Prior Publication Data

US 2006/0002765 A1  Jan. 5, 2006

(51) Int. Cl.
*B23B 45/14* (2006.01)

(52) U.S. Cl. .................. 408/124; 408/1 R; 408/20; 403/338

(58) Field of Classification Search .............. 279/44, 279/45; 30/296.1, 500; 285/367, 410; 403/335, 403/338; 408/20, 124, 125, 238, 239 R, 408/239 A; 173/1, 170, 171, 216
See application file for complete search history.

(56) References Cited

U.S. PATENT DOCUMENTS

| | | | | |
|---|---|---|---|---|
| 718,306 | A | * | 1/1903 | Boring ..................... 279/45 |
| 1,185,487 | A | * | 5/1916 | Eastman .................. 285/119 |
| 2,790,292 | A | * | 4/1957 | Trecker .................... 56/16.9 |
| 3,006,663 | A | * | 10/1961 | Bowne ..................... 285/233 |
| 3,544,138 | A | * | 12/1970 | Von Eiff .................. 285/336 |
| 3,966,240 | A | * | 6/1976 | Enomoto .................. 285/367 |
| 4,091,514 | A | | 5/1978 | Motes-Conners et al. |
| 4,122,601 | A | * | 10/1978 | Katsuya ................... 30/298.4 |
| 4,176,991 | A | * | 12/1979 | Egli ....................... 408/239 R |
| 4,247,216 | A | | 1/1981 | Pansini |
| 4,452,097 | A | * | 6/1984 | Sunkel ..................... 74/502.4 |
| 4,463,498 | A | * | 8/1984 | Everts ..................... 30/296.1 |
| 4,505,040 | A | * | 3/1985 | Everts ..................... 30/296.1 |
| 4,647,073 | A | | 3/1987 | Kosaka |
| 4,663,796 | A | | 5/1987 | Helling et al. |
| 4,733,471 | A | * | 3/1988 | Rahe ....................... 30/276 |
| 4,934,109 | A | | 6/1990 | Allred |
| 4,989,323 | A | * | 2/1991 | Casper et al. ............. 30/296.1 |
| 5,272,788 | A | * | 12/1993 | Gilstrap .................... 16/422 |
| 5,364,207 | A | | 11/1994 | Reber et al. |
| 5,430,921 | A | | 7/1995 | McGuire |
| 5,435,673 | A | * | 7/1995 | Rangel ................... 408/239 R |
| 5,462,077 | A | | 10/1995 | Cohen et al. |
| 5,482,413 | A | * | 1/1996 | Argaud .................... 408/124 |
| 5,570,617 | A | | 11/1996 | Love |

(Continued)

FOREIGN PATENT DOCUMENTS

DE  3237627 A1 * 4/1984

(Continued)

*Primary Examiner*—Monica Carter
*Assistant Examiner*—Michael W. Talbot
(74) *Attorney, Agent, or Firm*—Paul & Paul

(57) ABSTRACT

A tool assembly is provided for working on underground pipes, through a small hole at the pipe surface, by means of an elongate handle member that reaches into the hole, and has a coupling at the lower end thereof, whereby various ones of selected tools may be quickly connected to and disconnected from the lower end of the handle member, by means of a universal coupling, and whereby the tools can be pneumatically driven from above ground.

12 Claims, 5 Drawing Sheets

U.S. PATENT DOCUMENTS

| | | | |
|---|---|---|---|
| 5,613,807 A | 3/1997 | Reber et al. | |
| 5,624,206 A | 4/1997 | Cohen et al. | |
| 5,791,073 A | 8/1998 | Palmer et al. | |
| 5,913,335 A | 6/1999 | Lyall | |
| 5,988,689 A | 11/1999 | Lever | |
| 6,006,434 A * | 12/1999 | Templeton et al. | 30/296.1 |
| 6,056,332 A * | 5/2000 | Foster | 285/367 |
| 6,122,830 A * | 9/2000 | Jarzombek | 30/276 |
| 6,264,408 B1 * | 7/2001 | Lung et al. | 409/182 |
| 6,267,037 B1 | 7/2001 | McCoy, Jr. et al. | |
| 6,474,747 B2 * | 11/2002 | Beaulieu et al. | 30/296.1 |
| 6,523,866 B2 * | 2/2003 | Lin | 285/410 |
| 6,618,966 B2 | 9/2003 | Russo et al. | |
| 6,669,406 B2 | 12/2003 | Hutton et al. | |
| 6,684,908 B1 | 2/2004 | Hutton et al. | |
| 2002/0109355 A1 * | 8/2002 | Elliott | 285/410 |

FOREIGN PATENT DOCUMENTS

| | | |
|---|---|---|
| DE | 3926432 A1 * | 2/1991 |
| GB | 2038973 A | 7/1980 |
| GB | 2226869 A * | 7/1990 |
| JP | 2002-13693 | 1/2002 |

* cited by examiner

TOOL ASSEMBLY WITH UNIVERSAL COUPLING FOR VARIOUS TOOLS, FOR WORK ON UNDERGROUND PIPES

BACKGROUND OF THE INVENTION

In the art of working on underground pipes, it has been conventional for workers to dig a hole to access the pipe beneath ground, with the hole being of sufficient size that workers can get down into the hole, to work on the underground pipe. Often the underground pipe is on the order of 4 feet below the ground surface, such that the hole must first be excavated, and such excavation must be sufficient in amount to allow one or more workers to enter the hole and have sufficient room to work on the underground pipe.

Depending upon the depth of the pipe beneath the ground surface, the usual process requires excavation of large amounts of earth, causing considerable disruption to the surrounding landscape.

The present invention is directed to using a tool assembly for working on underground pipes through a hole at the ground surface that is small relative to the depth within the hole of the pipe being worked upon.

The tool assembly uses an elongate handle member adapted to be actuated from above ground at its upper end, and, at the lower end of the elongate handle member, there is a universal coupling. The coupling is connectable and disconnectable to the lower end of the handle member and is also connectable and disconnectable to adapters for various specific tools, preferably with a quick connect/disconnect feature.

The handle member is preferably hollow, for delivery of compressed air, for pneumatically driving tools that are down in the hole, from above ground.

SUMMARY OF INVENTION

The present invention is directed to a tool assembly and a process of using it, to work on underground pipes through a hole at the ground surface, while optionally employing any one of a plurality of different tools, for different tooling operations.

Accordingly, it is a primary object of this invention to provide a tool assembly and processes for using the assembly below ground, whereby a single handle member carries a universal coupling at its lower end, for selective connecting and disconnecting to any of various tools, each having their own adapter.

It is another object of this invention to accomplish the above object, wherein the coupling is connectable and disconnectable to the lower end of the handle member.

It is a further object of this invention to accomplish the objects set forth above, by pneumatically driving the tools in the hole, from above ground.

Other objects and advantages of the present invention will be readily apparent upon a reading of the following brief descriptions of the drawing figures, the detailed descriptions of the preferred embodiments, and the appended claims.

BRIEF DESCRIPTION OF THE DRAWING FIGURES

DETAILED DESCRIPTIONS OF THE PREFERRED EMBODIMENTS

Figure 1:
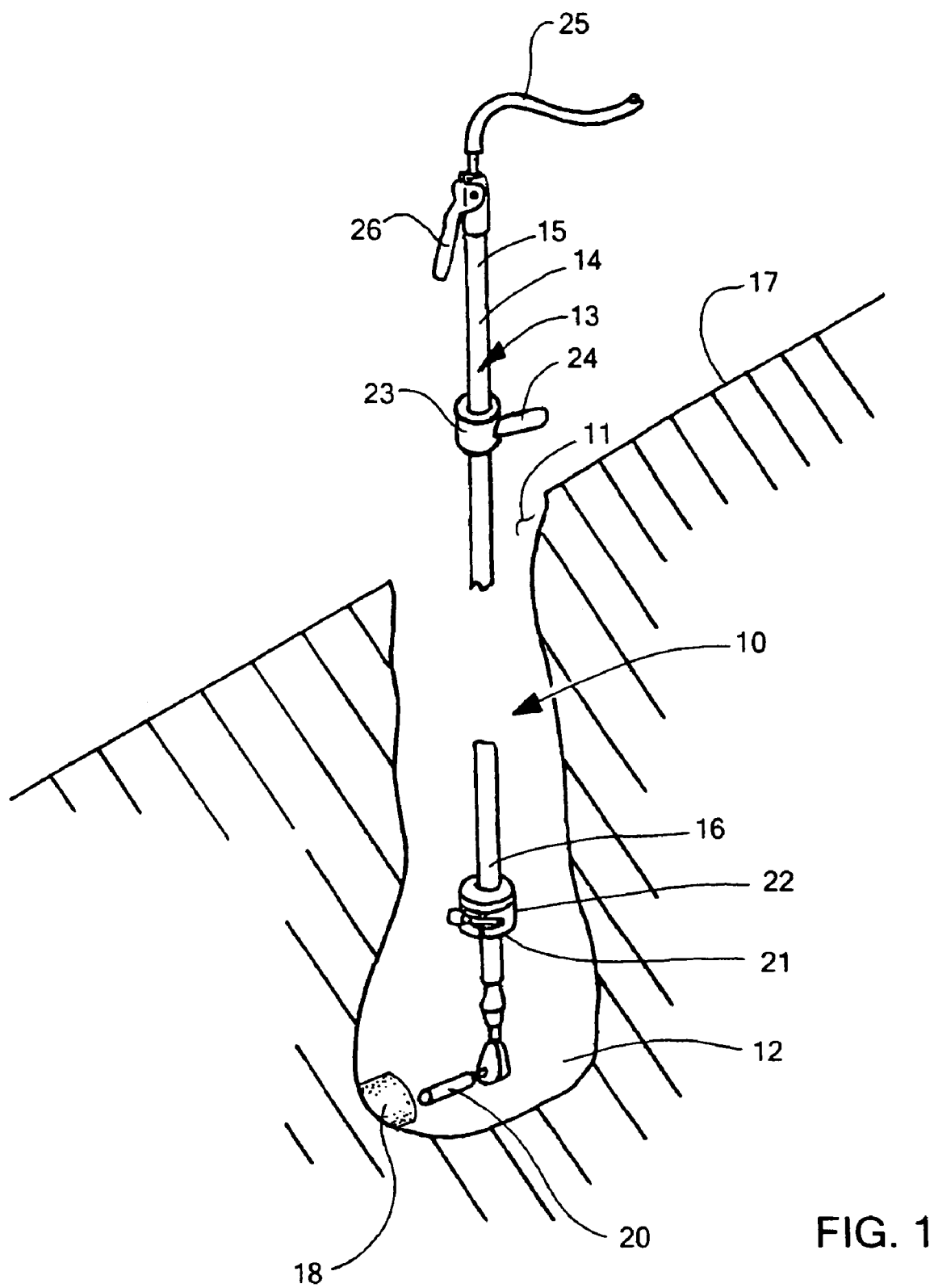
FIG. 1 is a vertical sectional view, taken through ground, showing a hole therein, wherein the access opening to the hole is considerably smaller in dimension than the depth of the hole, and wherein a tool assembly in accordance with this invention is shown placed in the hole, with the tool assembly being foreshortened, for the sake of clarity, due to the length of the tool handle.

Referring now to the drawings in detail, reference is first made to FIG. 1, wherein a hole in the ground is generally designated by the numeral 10, having a relatively small access opening 11 at the upper end, at ground level, and extending to the bottom of the hole 10 at 12.

A tool assembly in accordance with this invention is generally, designated by the numeral 13, and is shown in the hole 10. The tool assembly 13 includes an elongate handle member 14, having upper and lower ends 15 and 16, respectively. Typically, a measurement across the access opening 11 could be on the order of 18 inches, for example, and the depth of the hole, at the bottom 12 could be 4 feet below ground level 17.

A pipe 18 is shown, underground, adapted to be worked on by means of a tool. In the illustration of FIG. 1, a tool 20 is shown, by way of example only. The tool 20 is of a right-angle drive type, for working on the pipe 18. It will be understood that any of various types of tools may be used, in lieu of the right angle drive tool 20 that is shown here by way of example only.

Figure 9:
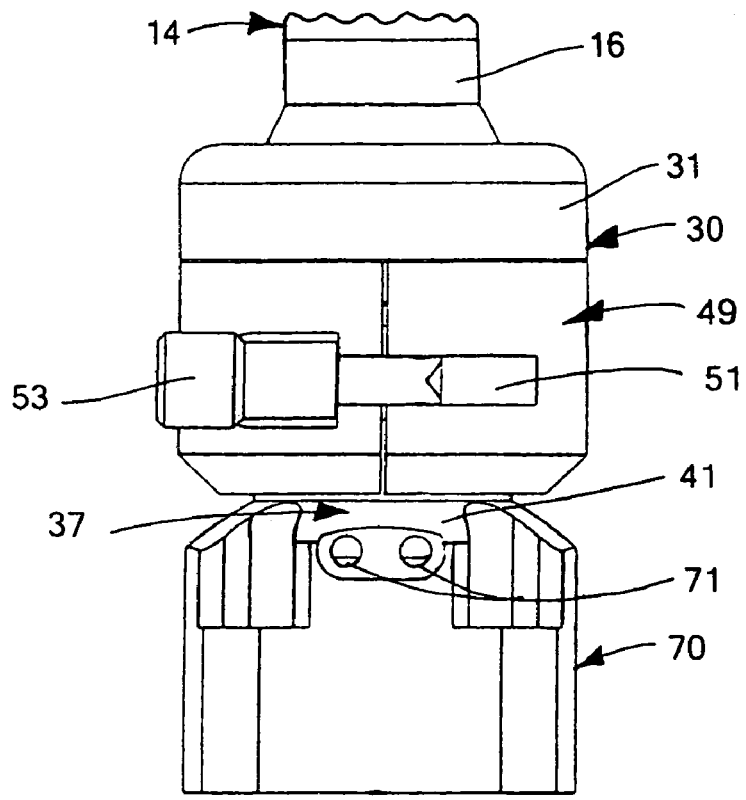
FIG. 9 is an elevational view of the coupling of this invention as shown in FIG. 8, but wherein the coupling extension has an adapter for a specific tool mounted thereon.
Figure 10:
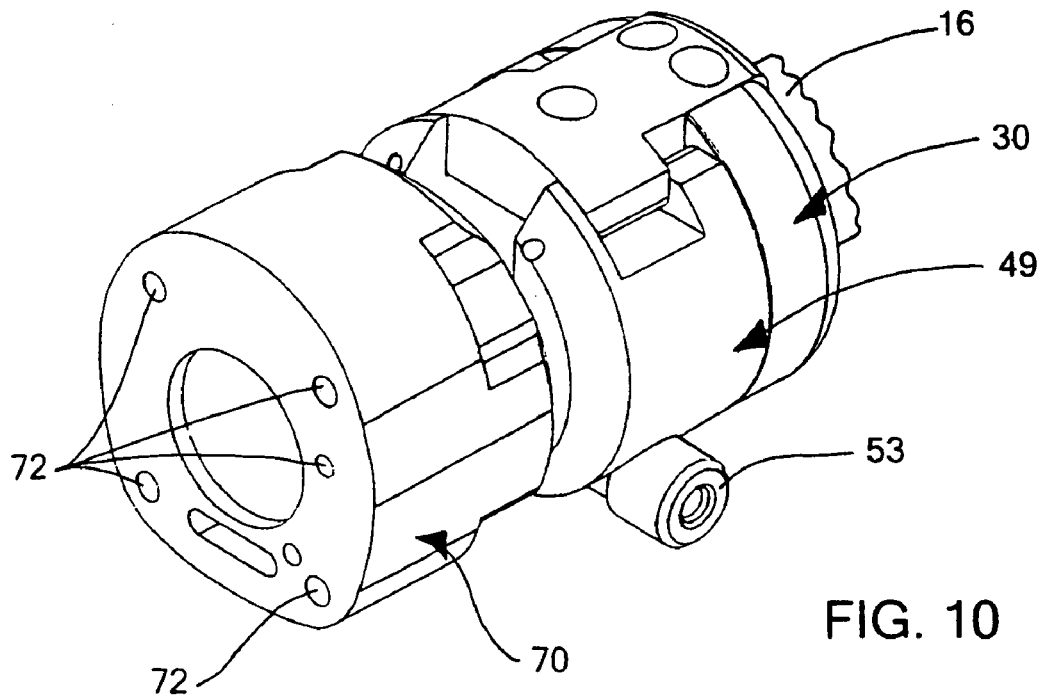
FIG. 10 is a perspective view of that which is illustrated in FIG. 9, but wherein the tool-specific adapter has means for attaching the tool at its lower end.

The tool 20 carries at its upper end an adapter 21 (not visible in FIG. 1, but shown clearly in FIGS. 9 and 10).

A universal coupling 22 connects the lower end 16 of the handle member 14, with a coupling extension carried by the tool adapter 21.

The handle member 14 has a sleeve 23 mounted thereto, at an above ground level, and carries a manual grip 24 thereon, so that a worker can grab the grip 24 to manipulate the handle 14, and consequently the tool 20 carried thereby, into proper position for working on an underground pipe.

The handle member 14 is hollow, for delivering compressed air supplied via line 25; when the manually actuable lever 26 is activated by the worker, by grabbing the same and pressing it toward the upper end 15 of the handle member 14, to open a valve disposed therein (not shown), to permit compressed air from line 25 to pass downwardly through the handle member 14, to the tool 20, for pneumatically driving the tool.

In the course of delivery of compressed air to the tool 20, the air will pass through the coupling 22, and the tool-specific adapter 21.

Figure 2:
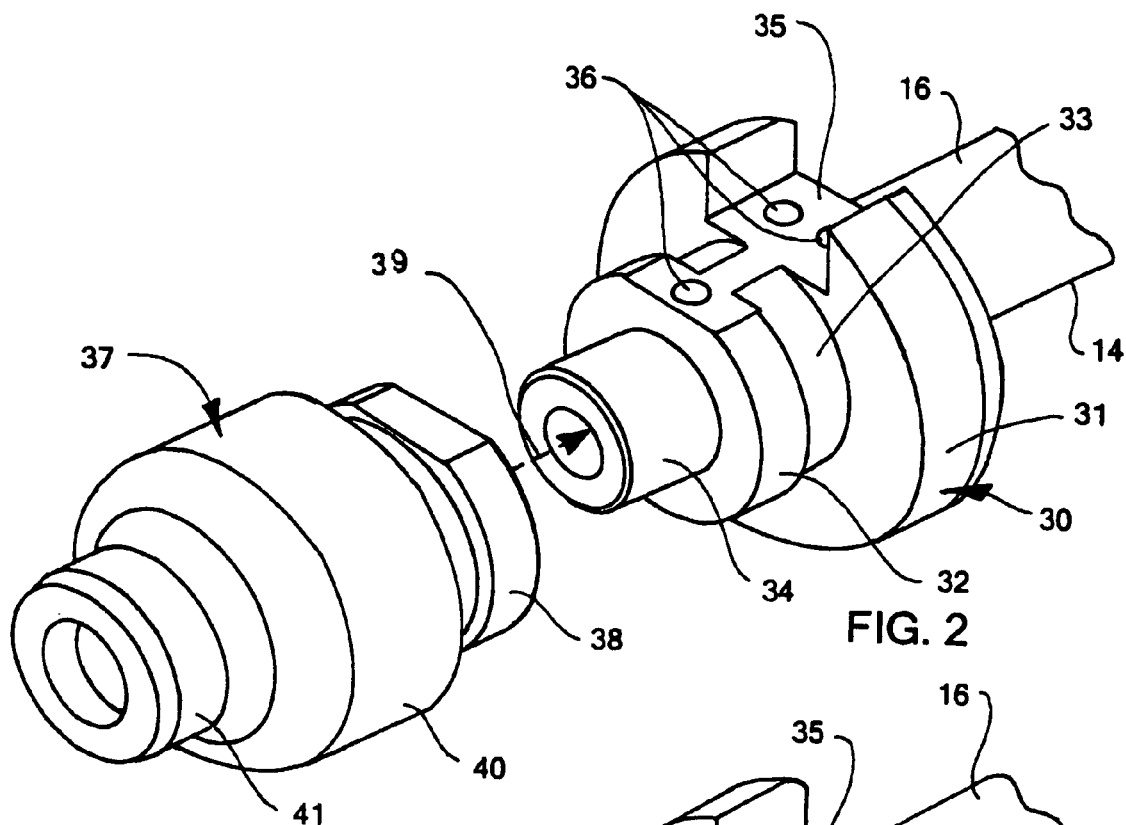
FIG. 2 is a perspective view of the lower end of a handle member adapted to be connected to a coupling extension.
Figure 3:
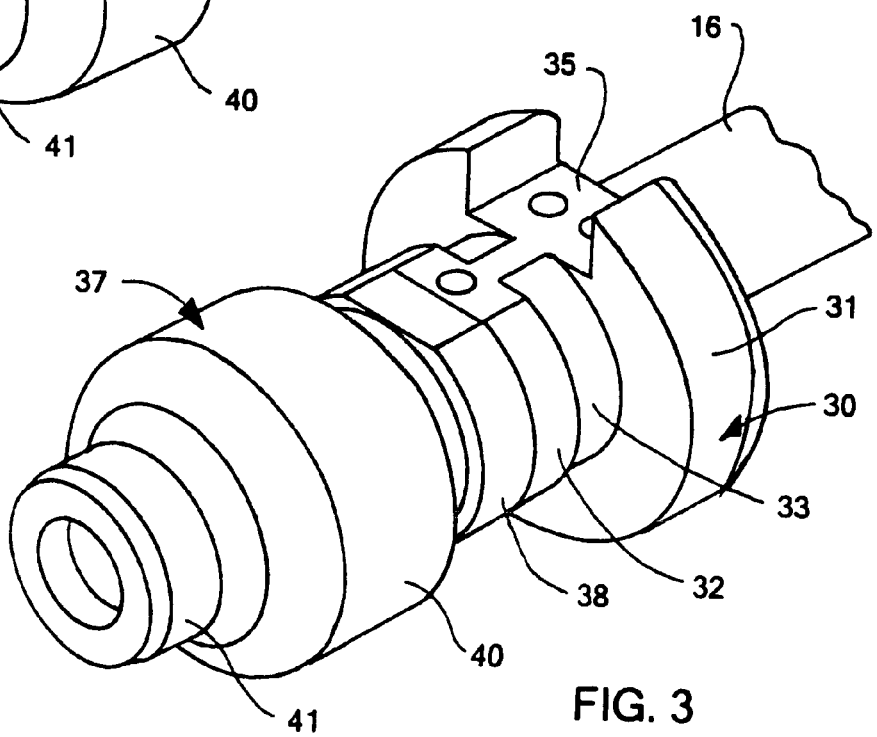
FIG. 3 is an illustration like that of FIG. 2, but wherein the lower end of the handle member and the upper end of the coupling extension are brought into engagement with each other.

With specific reference to FIGS. 2 and 3, it will be seen that the lower end 16 of the handle member 14 has welded thereto a coupling connector 30, which thereby forms part of the lower end 16 of the handle member 14. The coupling connector 30 has a large diameter portion 31 and a smaller diameter portion 32, connected by an intermediate diameter portion 33, and ends with a protruding sleeve portion 34.

A flat zone 35 is provided, for bolted connection of a plate (to be described herein later), thereto, by means of bolts inserted into threaded holes 36.

A coupling extension 37 is provided, having a small diameter portion 38 and a larger diameter portion 40, terminating at its lower end in a tool-adapter connection 41.

The coupling extension 37 is adapted to be moved into engagement, in the direction of the arrow 39, such that the sleeve portion 34 is received into the smaller diameter portion 38 of the coupling extension 37, with suitable "O"-ring seals (not shown), for air-tight connection therewith, in the manner shown in FIG. 3.

Figure 4:
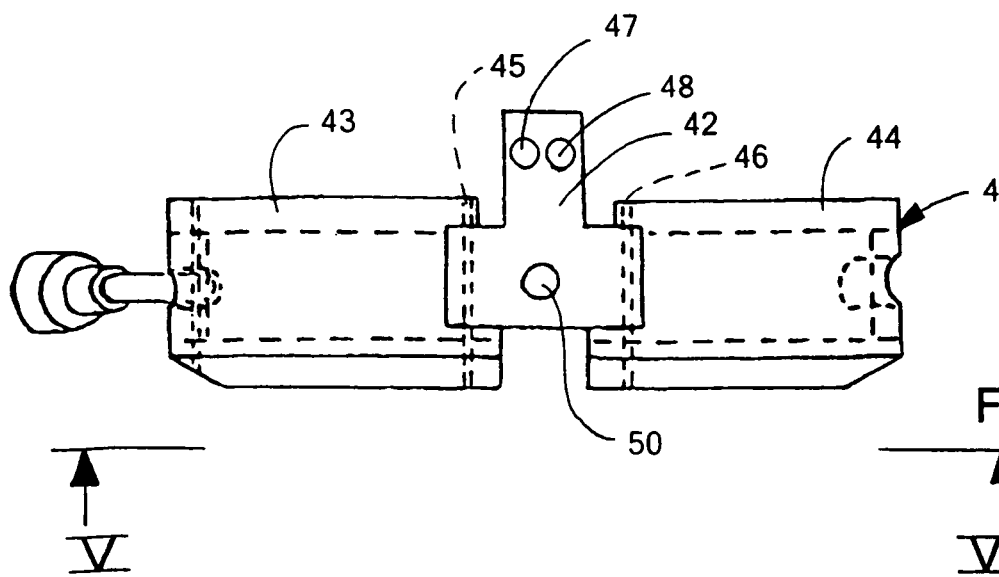
FIG. 4 is a front elevational view of the coupling for coupling the components illustrated in FIGS. 2 and 3 together, with the coupling being shown in its open position.
Figure 5:
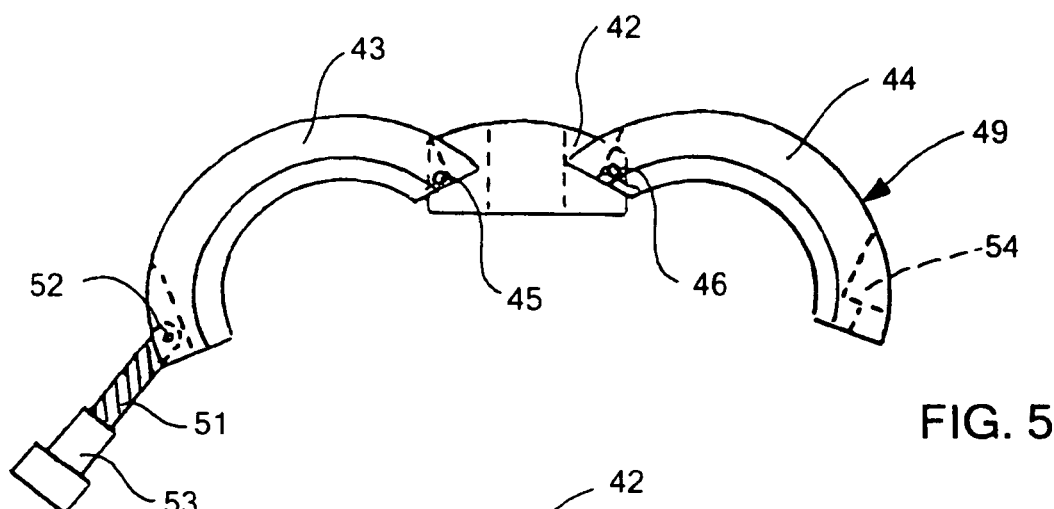
FIG. 5 is a bottom view of the coupling illustrated in FIG. 4, taken generally along the line V-V of FIG. 4.
Figure 6:
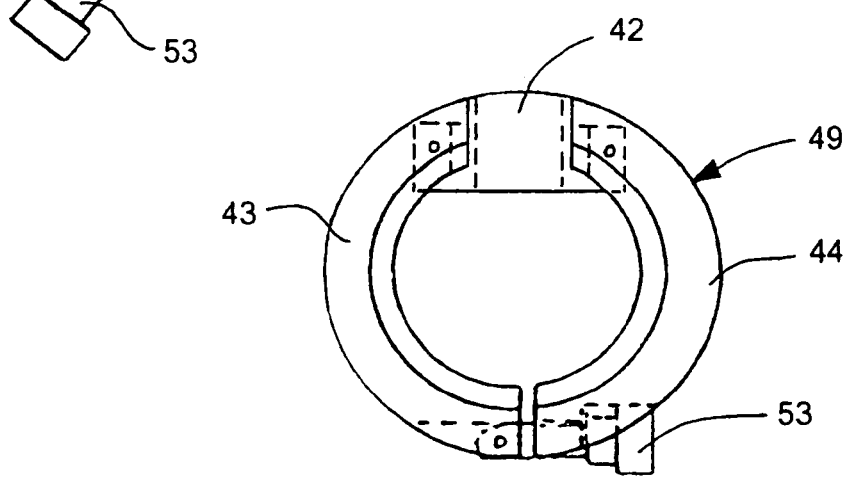
FIG. 6 is a bottom view of the coupling of FIG. 5, shown in the clamped-closed position.

With reference now to FIGS. 4-6, the coupling will now be described.

The coupling includes a hinge plate 42, and left and right coupling sleeve halves 43 and 44, pivotally connected to the plate 42, by suitable hinge pins 45, 46. The plate 42 has three bolt-receiving holes 47, 48 and 50, as shown.

Each of the coupling sleeve halves 43, 44, is of arcuate construction, and together, along with the plate 42, essentially provide a circular configuration as shown in FIG. 6, when the sleeve halves are drawn together.

An over-center lock having threaded pin 51 is pivotally mounted to sleeve half 43, as shown, by means of pivot pin 52, and after the sleeve halves are closed, and the pin 51 is closed as shown in FIG. 6, with its threaded head 53, with internal threads is threaded down against the threads on the shank of the pin 51, with wherein the head 53 is received in recess 54 of the sleeve half 44. The two sleeve halves 43, 44 can he brought together, closing the sleeve halves 43, 44 in clamped arrangement, thereby securely clamping diameter portions 32 and 38 of coupling connector 30 and coupling extension 37 respectively together, and with the plate 42 being secured against flat 35 of coupling connector 30, by means of bolts (not shown) threaded into the three bolt holes 36, after passing through openings 47, 48 and 50.

Figure 7:
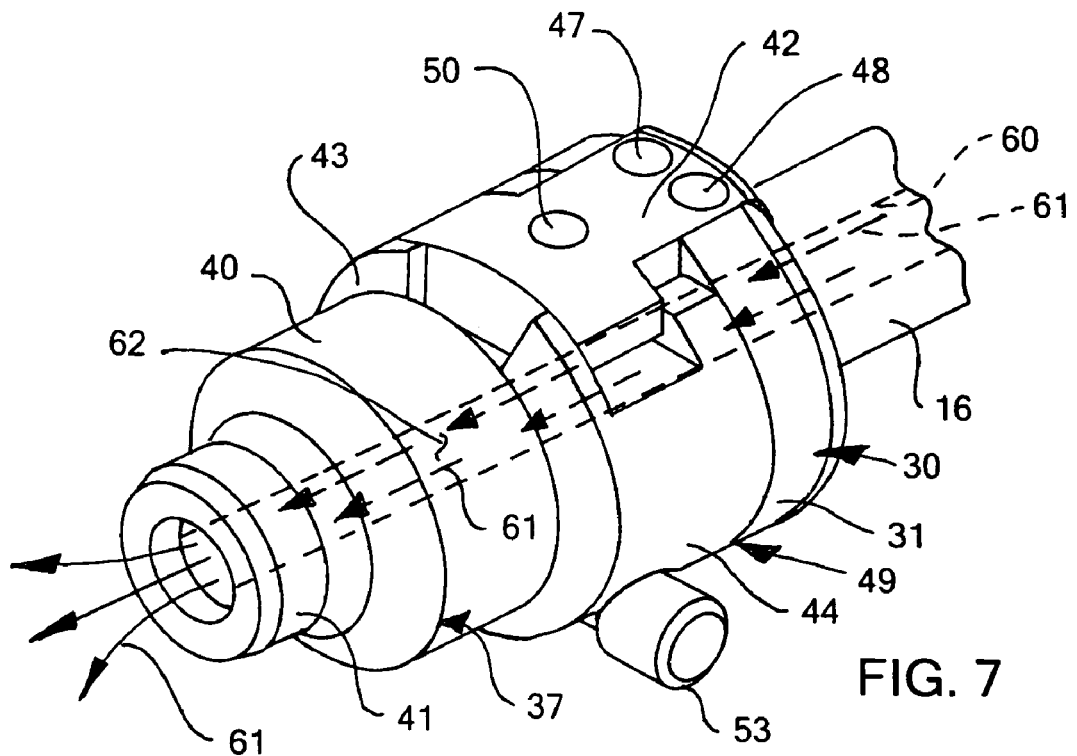
FIG. 7 is a perspective view of the components shown in FIGS. 2 and 3, coupled together by the coupling of FIGS. 4-6.
Figure 8:
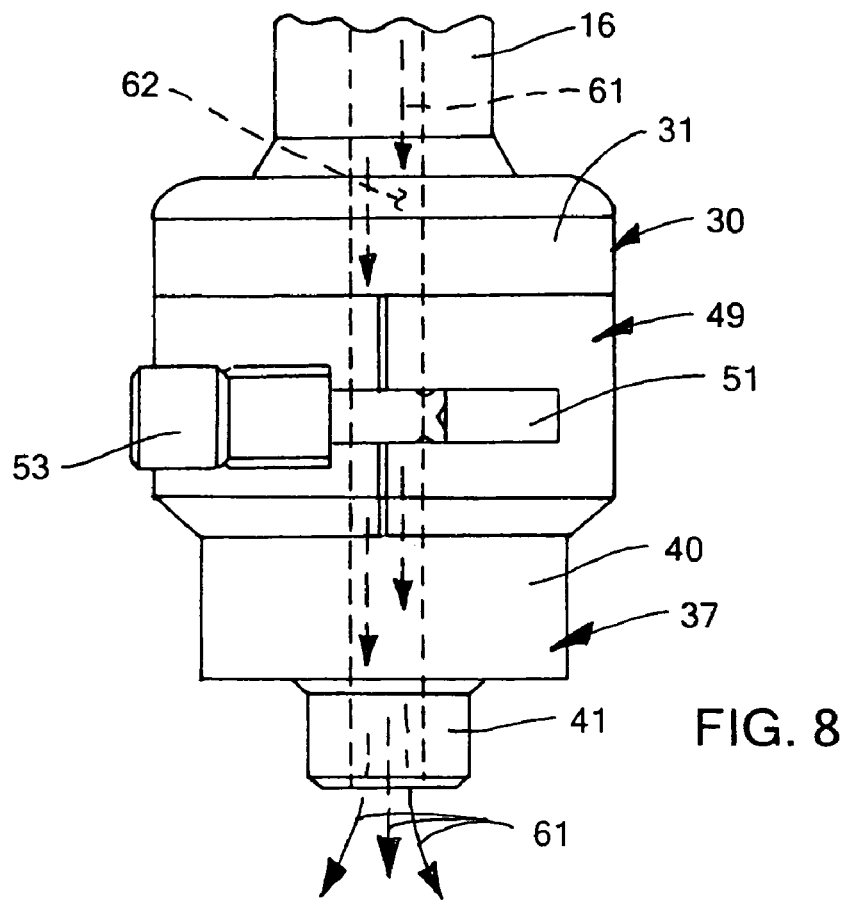
FIG. 8 is a rear elevational view of the coupling illustrated in FIG. 7.

With reference to FIGS. 7 and 8, the coupling arrangement in its coupled position is more clearly illustrated, with the coupling connector 30 coupled to the coupling extension 37, as shown, by means of the coupling generally designated by the numeral 49 being illustrated in FIGS. 4-6 and numeral 22 in FIG. 1.

A conduit 60, is shown in FIG. 7, for compressed air from a source 25 as shown in FIG. 1 to be delivered in the direction of the arrows 61, down through the coupling connector 30 and onto coupling extension 37 and its sleeve type, tool adapter connection 41, as shown, via air conduit 62. Coupling connection 37 has the air coupling 62 receiving air from the conduit 60 and passing through the tool adapter connection 41.

With reference now to FIG. 9, it will be seen that the coupling 49 is shown, coupling together the coupling connector 30 to the coupling extension 37.

A tool adapter 70 is shown, FIGS. 9 and 10, clampingly engaged against the sleeve type, tool adapter connection 41 of the coupling extension 37, the adapter 70 being clamped against the periphery of tool adapter connection 41 by means of set screws 71 or the like in engagement thereagainst, with the adapter 70 being tool-specific, for connection to a specific tool, such as a grinder, a reciprocating saw, a drill, a right-angle drive, needle scaler, or the like.

It is thus seen that any selected ones of various tools may be quickly connected to, or disconnected from the lower end 16 of the handle member 14, by means of the over-center lock provided by members 53, 52 and 51, of the coupling 49, to release the coupling extension 37 from the coupling connector 30 carried by the handle member 14. Thus, adapters such as that 70 may be pre-applied to coupling extensions such as member 37, with the adapters 70 being tool-specific, and simple over-center lock action of the members 51, 52 and 53, can clamp or release the coupling 49, such that a different tool may be connected to the lower end 16 of the handle member 14, rapidly and efficiently, by simply connecting its adapter with a coupling extension 37 carried thereby, to the coupling connector 30, via the coupling 49. It will be understood that any of these specific tools may be mounted to their tool-specific adapter 70 by bolts or the like, connected to threaded bolt holes 72 or the like.

It will be apparent from the foregoing that various modifications may be made in the details of construction, as well as in the use and operation of the tool in accordance with this invention, all within the spirit and scope of the invention as defined in the appended claims.

What is claimed is:

1. A tool assembly for working on underground pipes through a hole at the ground surface and optionally employing any one of a plurality of tools for different tooling operations, the tool assembly comprising:
    (a) an elongate handle member having an upper end and a lower end and adapted to extend to a location substantially proximate a said underground pipe with said lower end;
    (b) an openable and closeable coupling in engagement with the lower end of the handle member said coupling having a connector member and an extension member, said connector member being in removable attachment to the lower end of the handle member;
    (c) a plurality of different tools for performing different tooling operations with each said tool being carried by its own tool specific adapter wherein each adapter has means for removable engagement with said coupling extension member; and
    (d) wherein when said coupling is closed said extension member is engaged with said connector member and when said coupling is opened said extension member is disengaged from said connector member;
    (e) clamp means attached to said connector member and closable about said connector member and said extension members when they are engaged thereby securing them together;
    (f) wherein said elongate handle member can be connected and disconnected to any one of said plurality of different specific tools by releasing said clamping means and disengaging said extension member with said tool specific adapter and said tool;
    (g) including conduit means carried b each of said handle member and said coupling connector member and extension member, for driving said tools through said handle member and said coupling member from above ground; and (h) wherein said conduit means includes means for pneumatically driving said tools.

2. The tool assembly of claim 1, including a plurality of like extension members one with each tool adapter and associated tool thereby permitting quick connect/disconnect of a desired tool.

3. The tools assembly of claim 1, wherein said tool adapter carries a plurality of set screw like members for removably attaching said tool adapter and its associated tool from said extension member thereby permitting plural tools to be mounted.

4. The tool assembly of claim 3, wherein said clamp means is an over-center clamp.

5. The tool assembly of claim 1, wherein said coupling has a first end being said connector member in disconnectable engagement with the lower end of the handle member and a second end being said extension member having a tool adapter connection means for universal engagement and disengagement with each adapter carried by any selected one of a plurality of tools, each having a specific function, said tool assembly also including conduit means carried by each of said handle member and said coupling connector and extension members, for driving said tools through said handle member and said coupling connector and extension members from above ground, wherein said coupling includes quick-connect/disconnect means for connecting and disconnecting tool adapters of the tools from said coupling and wherein said quick-disconnect means includes over-center clamp means, wherein the coupling includes a coupling extension carried by the tool adapter, and the quick-connect/disconnect means comprises means for connecting and disconnecting the handle member and the coupling extension, via the coupling.

6. A process of working on underground pipes through a hole at the ground surface and optionally employing any one of a plurality of tools for different tooling operations, wherein the depth of the pipe below ground is substantially greater than the size of the hole at the ground surface, the process comprising:
   (a) providing a single elongate handle member extending, at an upper end of the handle member from a position substantially above a ground level hole, into the hole to a location substantially proximate a below ground pipe at a lower end of the handle member said handle member having an air conduit extending therethrough and a compressed air fitting at the upper end thereof;
   (b) providing a quick openable and closeable coupling in engagement with the lower end of the handle member said coupling having an air conduit extending therethrough and engaged with said handle member air conduit at one end of said coupling;
   (c) providing a plurality of different tools for performing different tooling operations:
   (d) providing for each said tool its own adapter carrying the tool;
   (e) engaging any said adapter into removable engagement with said openable and closable coupling;
   (f) whereby the single elongate handle member can be connected and disconnected to any one of said plurality of different specific tools by said coupling and said one of said tools can be operated by compressed air applied to the upper end of the handle member; and
   (g) quickly connecting and disconnecting tool adapters of the tools from the coupling.

7. The process of claim 6, including the step of disconnectably engaging a first end of the coupling with the lower end of the handle member and engaging a second end of the coupling, through a universal engagement and disengagement portion thereof, with an adapter carried by any selected one of a plurality of tools, each having a specific function.

8. The process of claim 6, wherein the step of quickly disconnecting includes connecting the tool head by an over-center clamp means.

9. The process of claim 6, including the step of disconnectably engaging a first end of the coupling with the lower end of the handle member and engaging a second end of the coupling, through a universal engagement and disengagement portion thereof, with an adapter carried by any selected one of a plurality of tools, each having a specific function, including providing a conduit carried by each of the handle member and coupling, and driving the tools through the handle member and coupling from above ground, and wherein the step of quickly disconnecting includes connecting the adapter by an over-center clamp.

10. A quick connect/disconnect pneumatic tool assembly for working on underground pipe through surface holes, comprising:
   an elongate handle having an upper end and a lower end with a longitudinal internal air conduit with a fitting at the upper end;
   a coupling having a first and second members connectable and separable from each other, said first member being removable attached to the lower end of said elongate handle, said coupling having an air conduit therethrough wherein said air conduit portion through said first member meets said elongate handle conduit,
   a pneumatic tool mounted to said coupling second member; and
   an over-center clamp clampable about said first and second coupling members thereby securing any connection therebetween.

11. The quick connect/disconnect pneumatic tool assembly of claim 10, wherein said coupling first member has a first diameter portion in removable attachment to said elongate handle, a second diameter portion connected to sad first diameter portion, wherein said coupling second member has a first diameter portion and a tool adapter connection connected thereto, wherein said tool includes a tool adapter attached to said coupling tool adapter connection with said tool mounted to said tool adapter, and wherein said separation of said second coupling member from said first coupling member facilitates a change of tooling.

12. The quick connect/disconnect pneumatic tool assembly of claim 11, wherein said over-center clamp includes a first sleeve half and a second sleeve half joined by a hinge plate, said hinge plate being mounted onto said coupling first member whereby said first and second sleeve members can clamp about both said first and second coupling members together when they are engaged, said over-center clamp including a threaded pin pivotally attached to said first sleeve half, said threaded pin carrying a threaded head, said second sleeve half having a recess for said threaded head to engage whereby said first and second sleeve halves are closed upon one another.

* * * * *

UNITED STATES PATENT AND TRADEMARK OFFICE
CERTIFICATE OF CORRECTION

PATENT NO.         : 7,241,084 B2                                                Page 1 of 1
APPLICATION NO. : 10/881048
DATED              : July 10, 2007
INVENTOR(S)        : Hutton et al.

It is certified that error appears in the above-identified patent and that said Letters Patent is hereby corrected as shown below:

In the Claims

Column 4, line 63, replace "b" with --by--;
Column 6, line 32, replace "," with --;--;
Column 6, line 41, replace "sad" with --said--;

Signed and Sealed this

Twenty-first Day of August, 2007

JON W. DUDAS
*Director of the United States Patent and Trademark Office*